US010794782B2

(12) United States Patent
Tazbaz et al.

(10) Patent No.: US 10,794,782 B2
(45) Date of Patent: Oct. 6, 2020

(54) SYSTEMS AND METHODS OF MEASURING TORSIONAL RESISTANCE IN A HINGE

(71) Applicant: Microsoft Technology Licensing, LLC, Redmond, WA (US)

(72) Inventors: Errol Mark Tazbaz, Bellevue, WA (US); Luis Ariel Aldarondo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 95 days.

(21) Appl. No.: 16/148,847

(22) Filed: Oct. 1, 2018

(65) Prior Publication Data

US 2020/0103297 A1 Apr. 2, 2020

(51) Int. Cl.
*G01L 3/18* (2006.01)

(52) U.S. Cl.
CPC ...................... *G01L 3/18* (2013.01)

(58) Field of Classification Search
CPC .......................................... G01L 3/18
See application file for complete search history.

(56) References Cited

U.S. PATENT DOCUMENTS

| 2,563,984 | A | | 8/1951 | Witchger et al. |
| 4,067,225 | A | * | 1/1978 | Dorman ................ G01B 7/023 324/601 |
| 4,753,555 | A | | 6/1988 | Thompson et al. |
| 5,490,333 | A | | 2/1996 | Nelson et al. |
| 5,877,458 | A | * | 3/1999 | Flowers ................. G06F 3/045 178/18.01 |
| 6,065,220 | A | * | 5/2000 | Ohtsuka ................ G01B 5/016 33/542 |
| 6,989,679 | B2 | * | 1/2006 | Lieder ................... G01B 7/023 324/658 |
| 8,702,927 | B2 | * | 4/2014 | Bau .................. G01N 33/48728 204/403.01 |
| 9,151,788 | B2 | * | 10/2015 | Wilson ................... G01R 27/08 |
| 9,863,766 | B2 | | 1/2018 | Wallace et al. |
| 9,933,242 | B2 | | 4/2018 | Ruegsegger et al. |
| 2012/0274342 | A1 | | 11/2012 | Achord |
| 2013/0285790 | A1 | | 10/2013 | Ho et al. |

(Continued)

FOREIGN PATENT DOCUMENTS

| CN | 201407981 Y | 2/2010 |
| CN | 101788279 A | 7/2010 |

(Continued)

OTHER PUBLICATIONS

"International Search Report and Written Opinion Issued in PCT Application No. PCT/US19/052036", dated Jan. 2, 2020, 13 Pages.

(Continued)

*Primary Examiner* — Octavia Hollington
(74) *Attorney, Agent, or Firm* — Ray Quinney & Nebeker P.C.; Paul N. Taylor (57) ABSTRACT

A measurement device includes a probe having a first conductive surface, a second conductive surface, and an insulating layer. The second conductive surface is opposite the first conductive surface and fixed relative to the first conductive surface. The insulating layer is positioned between the first conductive surface and second conductive surface and electrically insulates the first conductive surface from the second conductive surface.

22 Claims, 5 Drawing Sheets

(56) References Cited

U.S. PATENT DOCUMENTS

| | | | |
|---|---|---|---|
| 2016/0223432 A1* | 8/2016 | Kubinski | G01N 15/0656 |
| 2016/0370172 A1 | 12/2016 | Christoph et al. | |
| 2018/0202803 A1 | 7/2018 | Ziegenbein | |

FOREIGN PATENT DOCUMENTS

| | | |
|---|---|---|
| CN | 101349539 B | 2/2012 |
| CN | 106644194 A | 5/2017 |
| DE | 3942206 A1 | 6/1991 |
| DE | 102012222154 A1 | 6/2014 |
| GB | 121506 A | 12/1918 |
| GB | 667671 A | 3/1952 |
| JP | 2013117915 A | 6/2013 |
| JP | 2017015437 A | 1/2017 |
| JP | 2017176275 A | 10/2017 |

OTHER PUBLICATIONS

"Flexbar", Retrieved From: https://www.tqscorp.com/docs/products/Flexbar-Catalog.pdf, Retrieved on: Jun. 12, 2018, 200 Pages.
"Split-Ball Probes Are Flexible and Universal Bore Gauges for Indicating Internal Measurements", Retrieved From: https://web.archive.org/web/20171205064140/http:/www.diatest.com/products/solutions-for-gauging/measurement-of-diameter-and-length/split-ball-probe/, Dec. 5, 2017, 3 Pages.

\* cited by examiner

SYSTEMS AND METHODS OF MEASURING TORSIONAL RESISTANCE IN A HINGE

CROSS-REFERENCE TO RELATED APPLICATIONS

N/A

BACKGROUND

Use of computing devices is becoming more ubiquitous by the day. Computing devices range from standard desktop computers to wearable computing technology and beyond. One area of computing devices that has grown in recent years is the hybrid, tablet, and other portable computers. Many hybrid computers include input devices that may be separated from the screen. When separated from the other components, the screen may function as a tablet computer.

Conventional laptop computers have a hinge between the screen and the keyboard portions of the laptop computer that supports the screen at a variety of angles between a closed position and an open position. Conventional tablet computers lack a support to hold the tablet in an upright or angled positioned. Tablet computers that include a support to hold the tablet increase a thickness of the tablet to package a hinge into the frame of the tablet computer that provides sufficient strength to support the tablet computer in a variety of positions. Handheld and pocket-sized portable computers can include hinges that are even smaller and that need to fit into even less available space in the device.

As the demand for portability in electronic devices increases, the need for higher performance hinges in smaller form factors increases, as well. Small hinge designs require precise measurements of manufacturing variations to produce the amount of torque appropriate for the size and type of device.

SUMMARY

In some implementations, a measurement device includes a probe having a first conductive surface, a second conductive surface, and an insulating layer. The second conductive surface is opposite the first conductive surface and fixed relative to the first conductive surface. The insulating layer is positioned between the first conductive surface and second conductive surface and electrically insulates the first conductive surface from the second conductive surface.

In some implementations, a measurement system includes a first probe, a second probe, a first support, and a second support. The first probe has a first side and a second side opposite the first side and fixed relative to the first side. The first side has a first sensing surface configured to generate a first contact signal, and the second side has a second sensing surface configured to generate a second contact signal. The second probe is configured to generate a third contact signal. The first support is attached to and supports the first probe, and the second support is attached to and supports the second probe.

In some implementations, a method for measuring an inner space includes positioning a first probe in the inner space, contacting an inner surface of the inner space with a first sensing surface of a first probe, contacting the inner surface of the inner space with a second sensing surface of the first probe while the first sensing surface remains in contact with the inner surface of the inner space, contacting the inner surface of the inner space with a second probe while the first sensing surface and second sensing surface remain in contact with the inner surface of the inner space, and measuring a first position of the first probe relative to a second position of the second probe.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of implementations of the disclosure will be set forth in the description which follows, and in part will be obvious from the description, or may be learned by the practice of such implementations. The features and advantages of such implementations may be realized and obtained by means of the instruments and combinations particularly pointed out in the appended claims. These and other features will become more fully apparent from the following description and appended claims or may be learned by the practice of such implementations as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 2-1 is a side view of an example hinge in a first position;

FIG. 2-2 is a side view of the example hinge of FIG. 2-1 in a second position;

DETAILED DESCRIPTION

This disclosure generally relates to devices, systems, and methods for measuring and tuning a rotatable joint between two structures. More particularly, the present disclosure relates to measuring the inner space of a portion of a hinge that has varying torsional resistance between a closed position and an open position. In some implementations, the hinge is a small component with limited moving parts, such as a hinge that allows the movement of two portions of an electronic device. In other implementations, the hinge allows the movement of a support arm in an electronic device. The hinge and/or support arm may have sufficient strength to support the electronic device at any angle of the support arm between the closed position and the open position while remaining movable by a user without the aid of tools. In other examples, the hinge and/or support arm may have sufficient strength to hold the electronic device in the open and/or closed state against the force of gravity or while the electronic device is carried or otherwise moved by a user. Because the hinge is small, any manufacturing variations can have comparatively large effects on the torque of the hinge, altering performance.

In some implementations, the measurement devices and methods described herein allow for a hinge to have an increased rotational resistance, a smaller overall thickness, a more progressive resistance curve, or combinations thereof relative to conventionally manufactured and measured hinges. For example, an implementation of measurement devices and methods described herein allows the precise manufacturing of a hinge with a frictional element that allows a smaller form factor than a conventional hinge. In other examples, an implementation of measurement devices and methods described herein allows the precise manufacturing of a hinge with different resistance regions depending on the rotational position of the hinge.

A measurement device and/or method according to the present disclosure includes a probe that has a first sensing surface and a second sensing surface configured to produce a first contact signal and a second contact signal with the hinge body, respectively. The first sensing surface and the second sensing surface are isolated from one another by an insulating layer positioned therebetween. The probe allows for a measurement of a convex portion of an inner surface of the hinge body by confirming the simultaneous contact of both the first sensing surface and the second sensing surface and, thereby, confirming a consistent placement of the probe. When utilized with a second probe configured to generate a third contact signal, a measurement device and/or method described herein may accurately measure an inner diameter of an inner space with convex features, such as fillets.

Figure 1:
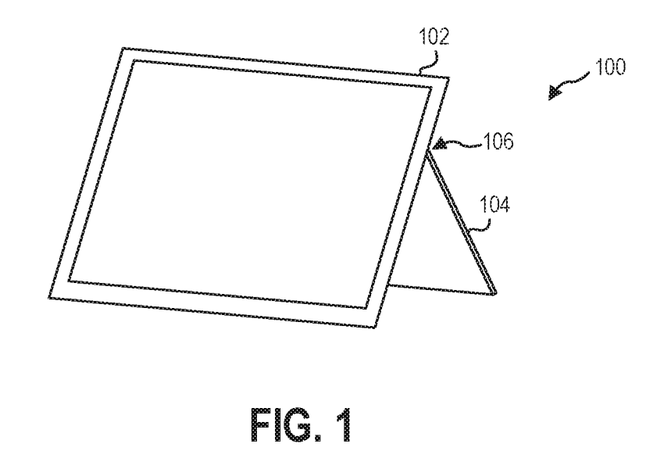
FIG. 1 is a perspective view of an implementation of an electronic device with a support arm.

FIG. 1 is a perspective view of an implementation of an electronic device 100. While the present disclosure will describe hinges in relation to a portable computer, it should be understood that various implementations of hinges described herein may be applicable to other devices, such as digital picture frames, cellular telephones (i.e., smartphones), video game consoles, videoconferencing displays, electronic readers, other electronic devices with displays, or other non-electronic devices. By way of example, an electronic device 100 may include a frame 102. The frame 102 may be rotatably connected to a support arm 104 about a hinge 106. The hinge 106 may allow the support arm 104 to move continuously between a closed position and an open position and support the frame 102 at a continuous range of angles relative to a surface on which the electronic device 100 rests.

In conventional devices with hinged support arms, the amount of force required to move the support arm 104 may be substantially constant throughout the range of movement. However, the amount of torque from the hinge 106 needed to support the electronic device 100 when the support arm 104 is positioned at a smaller angle (i.e., the hinge 106 is closer to the closed position and the electronic device 100 is nearly upright) may be less than the amount of torque needed to support the electronic device 100 when the support arm 104 is positioned at a larger angle (i.e., the hinge 106 is closer to the open position and the electronic device 100 is nearly flat). Implementations of some hinges vary the torque of the hinge relative to the position of the hinge to provide progressive torsional resistance as needed by the application.

Figure 21:
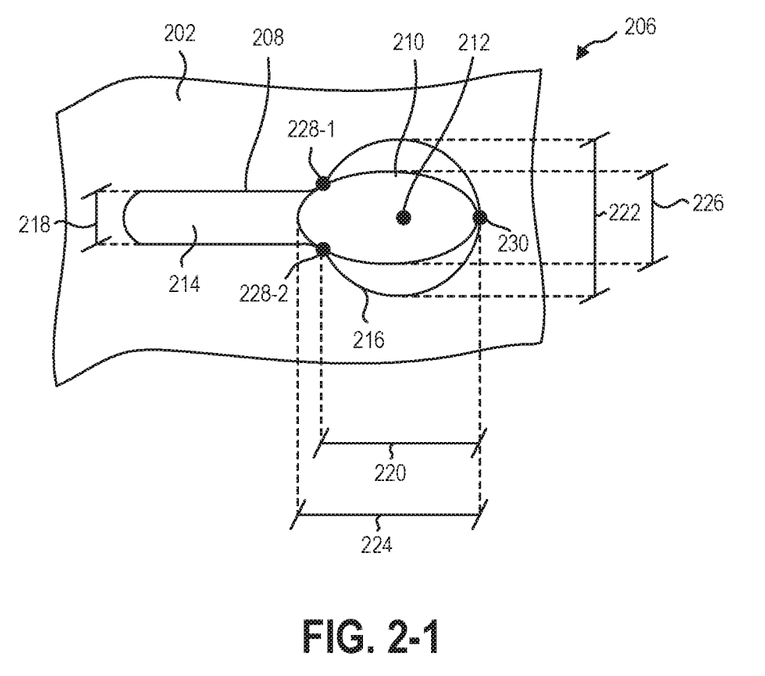
Figure 22:
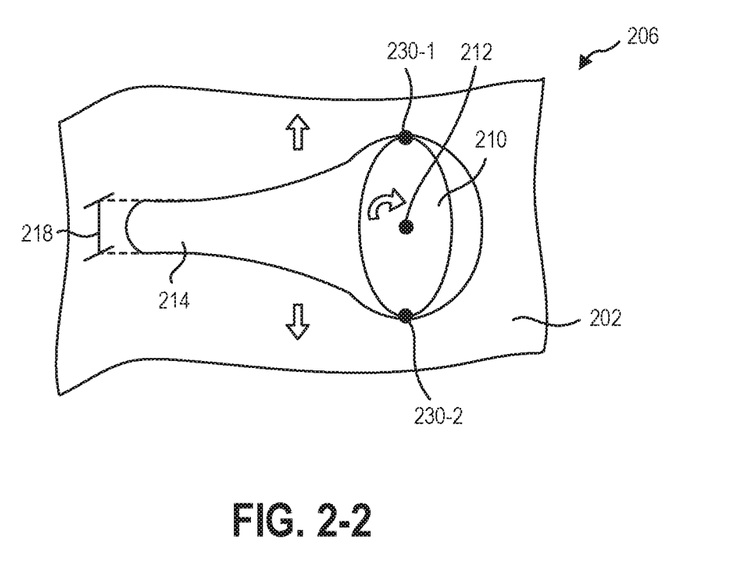

FIGS. 2-1 and 2-2 are side views of an example hinge 206 with a progressive torque. The hinge 206 includes an opening 208 and a non-circular axle 210 or other post positioned in the opening. The non-circular axle 210 contacts a plurality of points on the edge of the opening 208, generating a friction and creating a torque that resists the rotation of the axle 210 relative to the opening 208 of the hinge 206 about an axis 212. In some implementations, the opening 208 is positioned in a frame 202 of an electronic device, while in other implementations, the frame 202 of the hinge 206 is a hinge body independent of a larger device or system.

The hinge 206 generates torque based at least partly on the relative size and shape of the opening 208 and the axle 210. The opening 208 has a slot portion 214 that extends from the rotation portion 216 in which the axle 210 rotates. The slot portion 214 extends from the rotation portion 216 with at least one fillet point 228-1, 228-2 positioned therebetween. The slot portion 214 has a slot height 218, and the rotation portion 216 has a rotation portion width 220 and a rotation portion height 222. The rotation portion 216 is circular with a rotation portion width 220 and rotation portion height 222 that are equal.

In the first position, illustrated in FIG. 2-1, the axle 210 contacts the opening 208 in the frame 202 at the fillet points 228-1, 228-2 along a first side of the rotation portion 216 and at a secondary contact point 230 on an opposite side of the rotation portion 216. The torque generated at the first position that resists the rotation of the axle 210 relative to the opening 208 in the frame 202 may vary with changes in the dimensions of the axle 210 relative to the rotation portion 216 and, specifically, the location of the fillet points 228-1, 228-2.

However, machining variations and tolerances can cause small changes in the aspect ratio of the rotation portion width 220 and rotation portion height 222, as well as the location of the fillet points 228-1, 228-2. Small differences in the rotation portion width 220 and rotation portion height 222 relative to the axle width 224 and the axle height 226 have comparatively large effects on the torque produced by the rotation of the non-circular axle 210 relative to the rotation portion 216 of the opening 208. For example, in some implementations, the slot height 218 is about 0.9 millimeter (mm) and the rotation portion height 222 is about 1.5 mm. In such examples, a 5.0 micrometer (μm) variation in the size of the opening 208 and/or the axle 210 relative to one another can result in a 10% variation in the torque generated by the hinge 206. Therefore, precise manufacturing and measurement of the opening 208 and axle 210 is advantageous for performance.

FIG. 2-2 illustrates the hinge 206 of FIG. 2-1 in a second position with the axle 210 rotated 90° from the first position about the rotational axis 212. The rotation of the non-circular axle 210 presses against the material of the frame 202. The frame 202 elastically deforms (the aspect ratio of the axle and the expansion of the frame 202 are shown exaggerated for clarity) with the slot height 218 increasing as the slot portion 214 expands. The axle 210 rotates and now contacts a first contact point 230-1 and a second contact point 230-2 opposite the first contact point 230-1. The second position of the axle 210 relative to the frame 202 generates the peak torque of the hinge 206.

Figure 3:
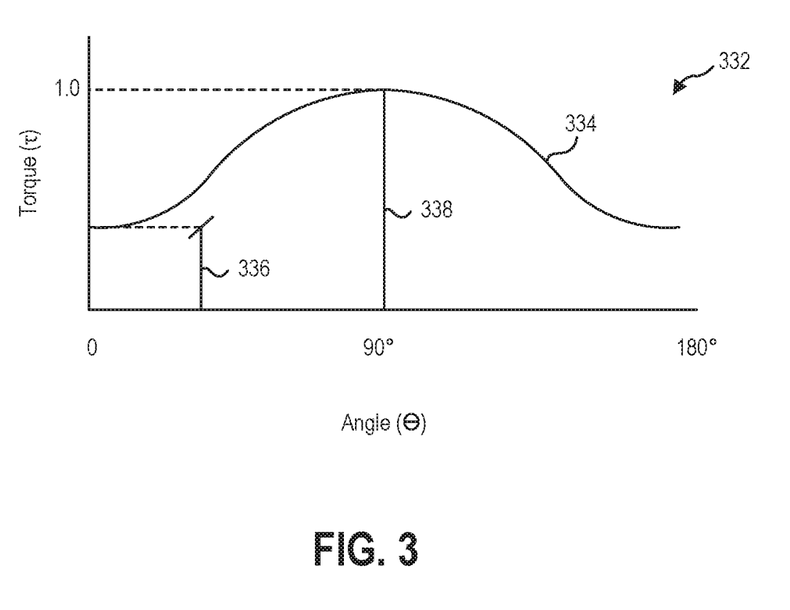
FIG. 3 is a graph illustrating an example torque curve of a hinge.

FIG. 3 is a graph 332 that depicts the torque curve 334 of a hinge such as that described in relation to FIGS. 2-1 and 2-2. For example, the torque curve 334 increases in magnitude as the angle of the axle rotates from the 0° orientation (i.e., the first orientation illustrated in FIG. 2-1) toward the 90° orientation (i.e., the second position illustrated in FIG. 2-2). The torque curve 334 decreases in magnitude as the angle of the axle rotates from the 90° orientation (i.e., the second position illustrated in FIG. 2-2) toward the 180° orientation which is symmetrical to the first position. The 0° orientation has an initial torque 336 when the axle is contacting the fillet points adjacent the slot portion, and the 90° orientation creates a peak torque 338 when the slot portion and frame are at the greatest amount of elastic deformation. Because small changes in the relative dimensions of the opening and axle can alter the initial torque 336, the peak torque 338, or any values of the torque curve 334 therebetween, accurate and precise measurement of the dimensions of the opening, and the rotation portion, in particular, is advantageous.

Figure 4:
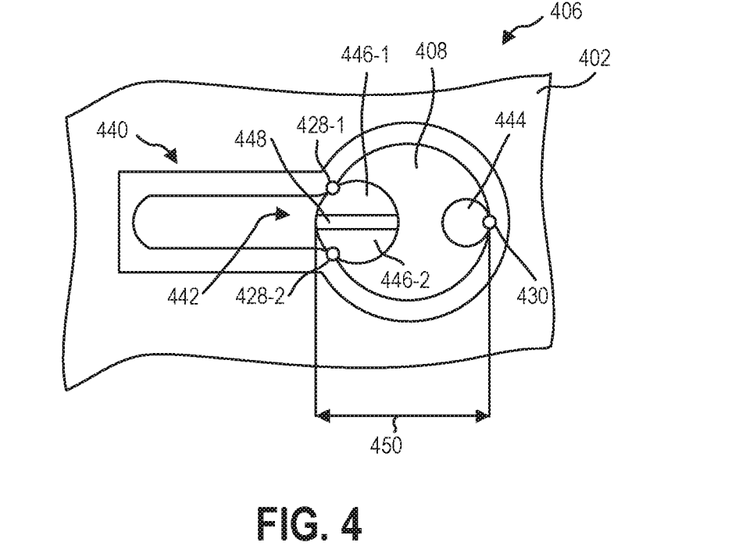
FIG. 4 is a side view of a measurement device measuring an inner space of a hinge body, according to at least one implementation of the present disclosure.

FIG. 4 is a side view of an implementation of a measurement device measuring an opening 408. The measurement device includes a first probe 442 and a second probe 444. The first probe 442 has a first side with a first sensing surface 446-1 and a second side with a second sensing surface 446-2 that are fixed relative to one another. The first sensing surface 446-1 is configured to detect a contact or touch of the first sensing surface 446-1 against another surface or object, and the second sensing surface 446-2 is configured to detect a contact or touch of the second sensing surface 446-2 against another surface or object. The first side may provide a first contact signal to confirm contact of the first side with a surface, and the second side may provide a second contact signal independent of the first contact signal to confirm contact of the second side with a surface. In some implementations, the first sensing surface 446-1 and second sensing surface 446-2 form an electrical circuit when both the first sensing surface 446-1 and second sensing surface 446-2 contact a common conductive object, indicating both surfaces are in contact. In other implementations, the object being measured is grounded, such that an electric potential of each of the first sensing surface 446-1 and second sensing surface 446-2 changes and indicates that both surfaces are in contact.

The first sensing surface 446-1 and second sensing surface 446-2 may be isolated from one another by an insulating layer 448 positioned between the first sensing surface 446-1 and second sensing surface 446-2. In some examples, the insulating layer 448 may be a solid layer of insulating material(s). In other examples, the first sensing surface 446-1 and second sensing surface 446-2 may be fixed relative to one another, but isolated from one another by an air gap (that acts as an insulating layer 448) between the first sensing surface 446-1 and second sensing surface 446-2. In at least one implementation, the insulating material 448 may limit and/or prevent the compression of the first sensing surface 446-1 and second sensing surface 446-2 toward one another during measurements, such that the distance between the first sensing surface 446-1 and second sensing surface 446-2 remains substantially constant. For example, the distance between the first sensing surface 446-1 and second sensing surface 446-2 may deflect by less than 2%, less than 1%, or less than 0.1% during measurements.

The measurement device is configured to measure a distance 450 of an inner space of an object, such as a hinge body 440 in a frame 402. More specifically, a displacement of the first probe 442 and the second probe 444 may measure a distance 450 of an inner space of an object. In some implementations, the distance 450 is measured when the first sensing surface 446-1 and the second sensing surface 446-2 of the first probe 442 confirm a contact with two point of the inner surface, such as at fillet points 428-1, 428-2. While the first probe 442 is shown contacting convex surfaces, the first sensing surface 446-1 and the second sensing surface 446-2 may allow measurement of converging surfaces or concave surfaces, as well. In other implementations, the distance 450 is measured when the first sensing surface 446-1 and the second sensing surface 446-2 of the first probe 442 confirm a contact with the inner surface, such as at fillet points 428-1, 428-2 and the second probe 444 contacts at a contact point 430 of the opening 408. In such implementations, the second probe 444 may have a third sensing surface.

In some implementations, the distance 450 is measured using a strain gauge between the first probe 442 and the second probe 444. For example, the strain gauge may measure the amount of deflection of one or more supports that hold the first probe 442 and second probe 444 from an origin position. In other implementations, the distance 450 is measured using optical measurement, such as using a laser, to measure the relative position of the first probe 442 and second probe 444 irrespective of elastic deformation of portions of the measurement device.

In some implementations, the first sensing surface 446-1 and/or second sensing surface 446-2 of the first probe 442 and/or the second probe 444 may be conductive. The conductive sensing surface may measure an electric charge and/or potential when in contact with a conductive material to provide a confirmation or other contact signal that indicates the sensing surface is touching an inner surface of the opening 408. In other implementations, the first sensing surface 446-1 and/or second sensing surface 446-2 of the first probe 442 and/or a third sensing surface of the second probe 444 may include a compressive surface that measures a force applied thereto. For example, the first sensing surface 446-1 and/or second sensing surface 446-2 of the first probe 442 and/or the second probe 444 may include a piezoelectric layer with electrical properties that change under compression. In other examples, the first sensing surface 446-1 and/or second sensing surface 446-2 of the first probe 442 and/or the second probe 444 may have a compressible surface with two conductive layers that touch and conduct a signal. Applying a force to the upper conductive layer deflects the upper layer, contacting the second, lower layer and may register a touch on sensing surface.

In some implementations, the first sensing surface 446-1 and the second sensing surface 446-2 of the first probe 442 are both conductive touch sensing surfaces. In other implementations, the first sensing surface 446-1 and the second sensing surface 446-2 of the first probe 442 and the third sensing surface of the second probe 444 are all conductive touch sensing surfaces. The distance 450 measured by the first position and second position of the first probe 442 and second probe 444, respectively, may be measured when all three sensing surfaces confirm a touch against a conductive material.

Figure 5:
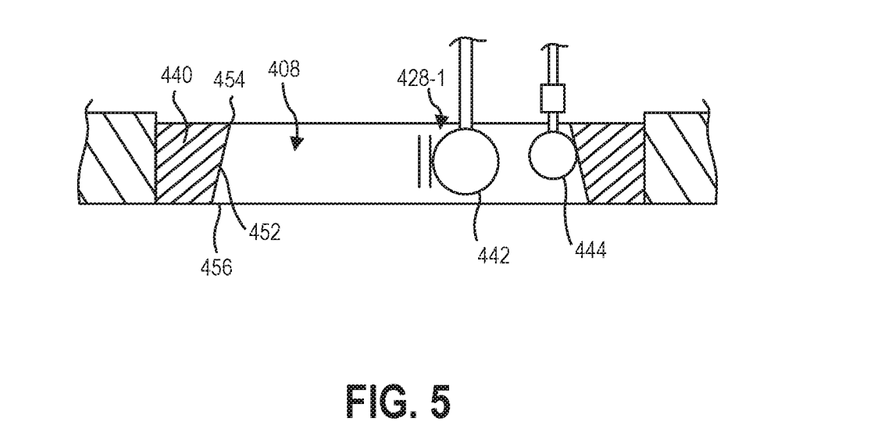
FIG. 5 is a cross-sectional top view of a measurement device measuring an inner space of a hinge body, according to at least one implementation of the present disclosure.

FIG. 5 is a cross-sectional view of the first probe 442 and second probe 444 of FIG. 4 positioned in the opening 408 of a hinge body 440. In the manufacturing process, the inner surface 452 of the opening 408 may develop a taper or slant relative to the upper surface 454 and/or lower surface 456 of the hinge body 440. For example, during machining of a metal piece, any compliance in the machining bit and/or the metal piece can cause the machined surface to develop at an angle to the intended orientation (e.g., non-orthogonal when an orthogonal surface was intended). In some implementations, the first probe 442 is at least partially curved to provide a single contact location between a sensing surface of the first probe 442 and the inner surface 452 of the opening 408. For example, a curved first sensing surface of the first probe 442 will contact the first fillet point 428-1 at one contact location irrespective of the angle or taper of the inner surface 452 at the first fillet point 428-1.

In some implementations, the second probe 444 has a curved surface that will contact the inner surface 452 of the opening 408 at one contact location irrespective of the angle or taper of the inner surface 452. For example, the spherical second probe 444 illustrated in FIG. 5 allows the second probe 444 to contact the inner surface 452 at a location between the upper surface 454 and the lower surface 456 of the hinge body 440. In some implementations, the first probe 442 and the second probe 444 have the same shape. For example, both the first probe 442 and the second probe 444 may be spherical, ellipsoid, oval, prolate oval, irregular, cylindrical, or asymmetrical. In other implementations, the first probe 442 and the second probe 444 have different shapes. For example, the first probe 442 may be spherical, while the second probe 444 may be oval. In other examples, the first probe 442 may be a prolate oval in cross-section, while the second probe 444 may be spherical.

In some implementations, the first probe 442 and the second probe 444 are positioned in the opening 408 with a center of the first probe 442 between the upper surface 454 and the lower surface 456 to contact the inner surface 452 between the upper surface 454 and the lower surface 456 for the distance measurement, such as illustrated in FIG. 5. In other implementations, the first probe 442 and the second probe 444 are positioned in the opening 408 with a center of the first probe 442 at or above the upper surface 454 to contact the inner surface 452 at the upper surface 454 for the distance measurement. In yet other implementations, the first probe 442 and the second probe 444 are positioned in the opening 408 with a center of the first probe 442 below the lower surface 456 to contact the inner surface 452 at the lower surface 456 for the distance measurement. In further implementations, a plurality of measurements is collected at different vertical locations along the inner surface 452 of the opening 408.

Figure 6:
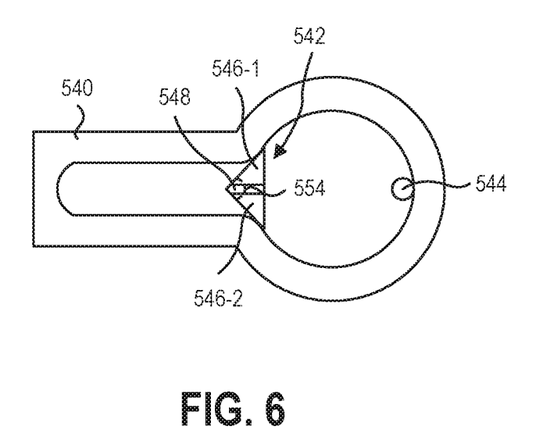
FIG. 6 is a side view of another measurement device measuring an inner space of a hinge body, according to at least one implementation of the present disclosure.

FIG. 6 illustrates a side view of a hinge body 540 being measured with another implementation of a first probe 542 and second probe 544. In some implementations, the first probe 542 has a first sensing surface 546-1 and/or a second sensing surface 546-2 that is at least partially planar and/or linear in cross-section. For example, the first probe 542 may be wedge-shaped with a planar first sensing surface 546-1 and a planar second sensing surface 546-2. In other examples, the first probe 542 may be conical with a hemi-conical first sensing surface 546-1 that is linear in cross-section and a hemi-conical second sensing surface 546-2 that is linear in cross-section.

The first sensing surface 546-1 and second sensing surface 546-2 may be oriented with an angle 554 therebetween (with an insulating layer 548 therebetween), where the angle 554 is in the plane of the first probe 542 and the second probe 544. In some implementations, the angle 554 is in a range having an upper value, a lower value, or upper and lower values including any of 45°, 60°, 75°, 90°, 105°, 120°, 135°, or any values therebetween. For example, the angle 554 may be greater than 45°. In other examples, the angle 554 may be less than 135°. In yet other examples, the angle 554 may be between 45° and 135°. In further examples, the angle 554 may be between 60° and 120°. In at least one example, the angle 554 may be about 90°.

Figure 7:
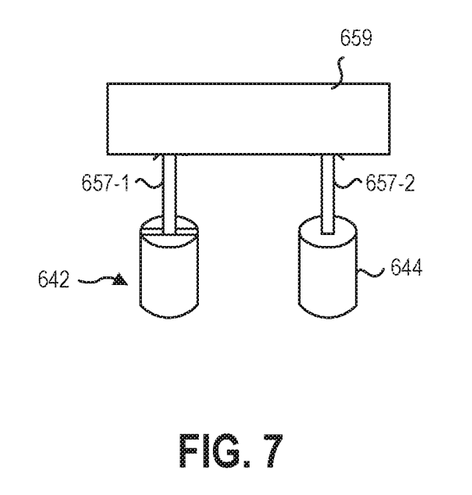
FIG. 7 is a top view of yet another measurement device supported by a computer numerical control (CNC) system, according to at least one implementation of the present disclosure.

In some implementations, the first probe 542 and/or second probe 544 are curved in a first direction toward the hinge body 540, but linear and/or planar in a second direction orthogonal to the first direction. For example, FIG. 7 illustrates a measurement system with a first probe 642 connected to a first support 657-1 and a second probe 644 connected to a second support 657-2. The first support 657-1 and second support 657-2 are electronically positioned, for example by a computer numerical control (CNC) system 659, and the first position of the first support 657-1 and first probe 642 relative to the second position of the second support 657-2 and second probe allows for the measurement of a distance therebetween.

In some implementations, the first probe 642 is cylindrical, with the sensing surface(s) being linear in the direction of the first support 657-1 and curved in the plane orthogonal to the direction of the first support 657-1. In other implementations, the second probe 644 is also cylindrical. A cylindrical probe may contact an inner surface of an opening to be measured at either the upper surface or a lower surface of the inner surface. In some instances, having both the first probe 642 and the second probe 644 be cylindrical may help the first probe 642 and second probe 644 to contact the inner surface in the same plane (i.e., both at the upper surface or both at the lower surface).

Figure 8:
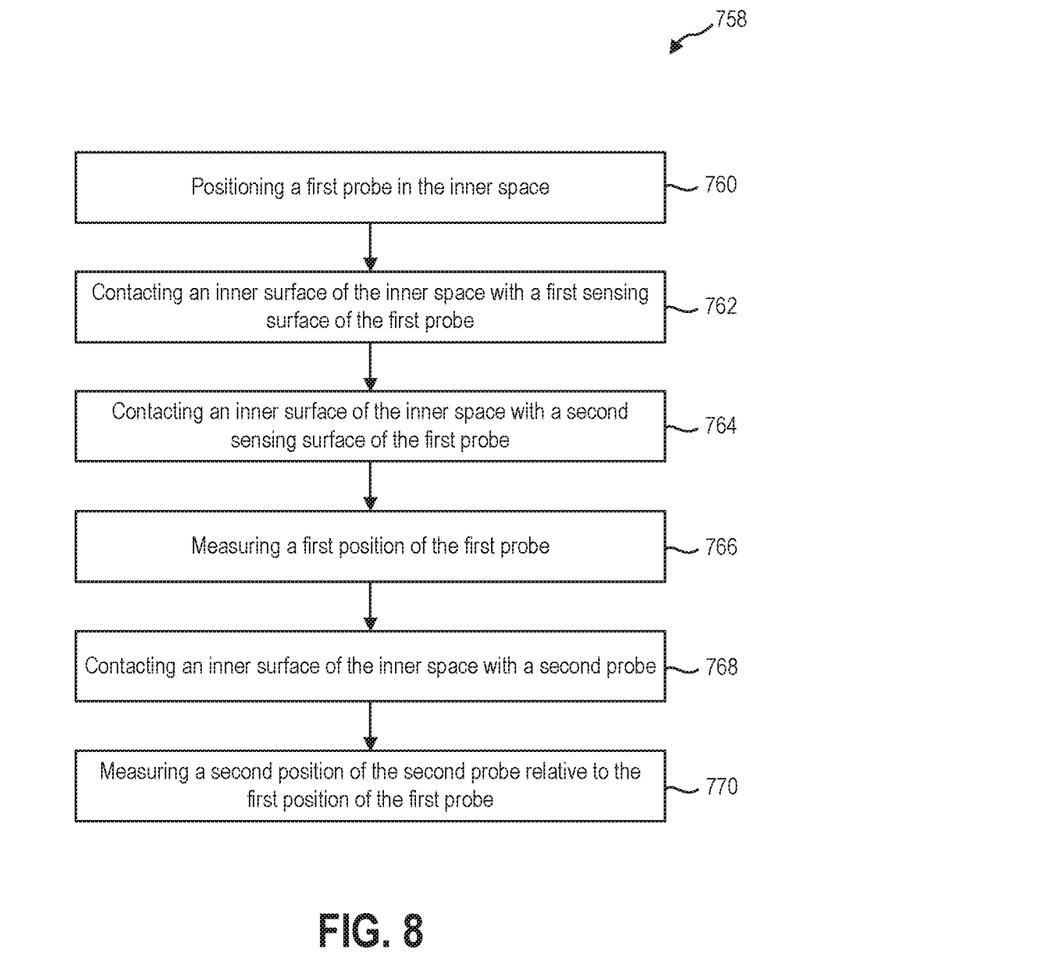
FIG. 8 is a flowchart illustrating a method of measuring an inner space of an object, according to at least one implementation of the present disclosure.

FIG. 8 is a flowchart illustrating an implementation of a method 758 of measuring a portion of a non-circular opening or other inner space of an object. The method includes positioning a first probe in the inner space at 760. The method further includes contacting an inner surface of the inner space with a first sensing surface of the first probe at 762 and contacting the inner surface of the inner space with a second sensing surface of the first probe at 764. The method includes measuring a first position of the first probe at 766 while the first sensing surface and the second sensing surface are both contacting the inner surface. The method further includes contacting an inner surface of the inner space with a third sensing surface of a second probe at 768 and measuring a second position of the second probe relative to the first position of the first probe at 770 while the second probe is in contact with the inner surface.

In some implementations, measuring the first position of the first probe at 766 occurs after receiving a first contact signal from the first sensing surface and a second contact signal from the second sensing surface. The first contact signal may be generated by contacting a conductive surface of the first sensing surface to a metal or other conductive material of the inner surface being measured. In other examples, the first contact signal may be generated by the compression of an elastically deformable first sensing surface. The first contact signal provides a confirmation that the first sensing surface is in contact with the inner surface. The second contact signal may be generated by contacting a conductive surface of the second sensing surface to a metal or other conductive material of the inner surface being measured. In other examples, the second contact signal may be generated by the compression of an elastically deformable second sensing surface. The second contact signal provides a confirmation that the second sensing surface is in contact with the inner surface.

In some implementations, measuring the second position of the second probe at 770 occurs after receiving a third contact signal from the second probe. In some examples, the third contact signal may be generated by contacting a conductive surface of the third sensing surface to a metal or other conductive material of the inner surface being measured. In other examples, the third contact signal may be generated by the compression of an elastically deformable third sensing surface. In yet other examples, the third contact signal may be generated by a load cell in a support of the second probe, such that any deflection of the support caused by the contact of the second probe with the inner surface is detected and provided to the measurement system. The third contact signal provides a confirmation that the second sensing surface is in contact with the inner surface.

In some implementations, the first position and the second position are measured simultaneously. For example, the first position and second position may be measured while the first sensing surface and second sensing surface of the first probe are contacting the inner surface and the second probe is contacting the inner surface. In other implementations, the first position and second position are measures asynchronously. For example, the first position may be measured, the first probe then removed from the inner space, and the second probe may be subsequently positioned contacting the inner surface and the second position measured.

In at least one implementation, a measurement device with a first probe having a first sensing surface and a second sensing surface may provide more precise three-point measurements of a non-circular opening or other inner space. The three-point measurements may allow for more tightly controlled production of hinges and other mechanical devices, improving the performance, ease of use, and durability of electronic devices and other products.

One or more specific implementations of the present disclosure are described herein. These described implementations are examples of the presently disclosed techniques. Additionally, in an effort to provide a concise description of these implementations, not all features of an actual implementation may be described in the specification. It should be appreciated that in the development of any such actual implementation, as in any engineering or design project, numerous implementation-specific decisions will be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A measurement device comprising:
   a first probe having a first conductive surface, a second conductive surface opposite the first conductive surface and fixed relative to the first conductive surface, and an insulating layer positioned between the first conductive surface and second conductive surface and electrically insulating the first conductive surface from the second conductive surface; and
   a second probe in electrical communication with the first probe and configured to generate a contact signal upon contact with a third contact point, where a first contact point, a second contact point, and the third contact point are in the same plane.

2. The measurement device of claim 1, at least one of the first conductive surface or the second conductive surface being at least partially curved.

3. The measurement device of claim 1, at least one of the first conductive surface or the second conductive surface being at least partially linear.

4. The measurement device of claim 1, the first probe being spherical.

5. The measurement device of claim 1, the first probe being conical.

6. The measurement device of claim 1, the first probe being a wedge.

7. The measurement device of claim 1, the insulating layer being an air gap.

8. A measurement system comprising:
a first probe having:
 a first side,
 a second side opposite the first side and fixed relative to the first side, and
 wherein the first side has a first sensing surface configured to generate a first contact signal upon contact with a first contact point, and the second side has a second sensing surface configured to generate a second contact signal upon contact with a second contact point;
a second probe configured to generate a third contact signal upon contact with a third contact point, where the first contact point, the second contact point, and the third contact point are in the same plane;
a first support attached to and supporting the first probe; and
a second support attached to and supporting the second probe, the second support being movable relative to the first support.

9. The measurement system of claim 8, the first support and second support being controlled by a computer numerical control (CNC) system.

10. The measurement system of claim 8, wherein the second probe further comprises a load cell in the second support, the load cell being configured to provide a third contact signal.

11. The measurement system of claim 8, the second probe having a third sensing surface configured to provide the third contact signal.

12. The measurement system of claim 8, at least a portion of the first sensing surface being curved and at least a portion of the second sensing surface being curved.

13. The measurement system of claim 8, the first probe and second probe being spherical.

14. The measurement system of claim 8, the first sensing surface being electrically isolated from the second sensing surface.

15. The measurement system of claim 14, the first sensing surface being electrically isolated from the second sensing surface by an insulating layer of insulating material positioned between the first sensing surface and the second sensing surface.

16. A method for measuring an inner space, the method comprising:
positioning a first probe in the inner space;
contacting an inner surface of the inner space with a first sensing surface of the first probe;
contacting the inner surface of the inner space with a second sensing surface of the first probe while the first sensing surface remains in contact with the inner surface of the inner space;
contacting the inner surface of the inner space with a second probe while the first sensing surface and second sensing surface remain in contact with the inner surface of the inner space; and
measuring a first position of the first probe relative to a second position of the second probe to define a planar distance between the first position of the first probe and the second position of the second probe.

17. The method of claim 16, further comprising receiving a first contact signal from the first sensing surface and receiving a second contact signal from the second sensing surface.

18. The method of claim 17, further comprising receiving a third contact signal.

19. The method of claim 18, the third contact signal being provided by a third sensing surface of the second probe.

20. The method of claim 16, further comprising measuring the first position of the first probe and measuring the second position of the second probe while the first sensing surface and the second sensing surface are in contact with the inner surface and the second probe is in contact with the inner surface.

21. The method of claim 16, wherein an internal diameter of the inner space is about 1.5 mm or less.

22. The method of claim 16, wherein the planar distance is transverse to a longitudinal axis of the first probe or the second probe.

* * * * *